United States Patent
Övgård et al.

(10) Patent No.: US 11,827,086 B2
(45) Date of Patent: Nov. 28, 2023

(54) MOUNTING SYSTEM FOR ENERGY SOURCE FRAME

(71) Applicant: Volvo Car Corporation, Gothenburg (SE)

(72) Inventors: Fredrik Övgård, Gothenburg (SE); Klas Persson, Kungälv (SE)

(73) Assignee: VOLVO CAR CORPORATION, Gothenburg (SE)

( * ) Notice: Subject to any disclaimer, the term of this patent is extended or adjusted under 35 U.S.C. 154(b) by 141 days.

(21) Appl. No.: 17/223,412

(22) Filed: Apr. 6, 2021

(65) Prior Publication Data
US 2021/0309090 A1    Oct. 7, 2021

(30) Foreign Application Priority Data

Apr. 7, 2020 (EP) .................................. 20168357

(51) Int. Cl.
*B60K 1/04* (2019.01)
*H01M 50/249* (2021.01)

(52) U.S. Cl.
CPC ............. *B60K 1/04* (2013.01); *H01M 50/249* (2021.01); *B60K 2001/0438* (2013.01); *H01M 2220/20* (2013.01)

(58) Field of Classification Search
CPC ............. B60K 1/04; B60K 2001/0438; H01M 50/249; H01M 2220/20
See application file for complete search history.

(56) References Cited

U.S. PATENT DOCUMENTS

| | | | |
|---|---|---|---|
| 9,926,017 B1 * | 3/2018 | Hamilton | ............... B62D 25/20 |
| 2009/0152034 A1 | 6/2009 | Takasaki et al. | |
| 2011/0198137 A1 | 8/2011 | De Paschoal | |
| 2014/0186674 A1 | 7/2014 | Goesmann | |
| 2021/0050570 A1 * | 2/2021 | Dunlap | ............... H01M 50/249 |

FOREIGN PATENT DOCUMENTS

| | | |
|---|---|---|
| CN | 104701473 A | 6/2015 |
| CN | 110182034 A | 8/2019 |
| CN | 210062652 U | 2/2020 |
| DE | 2809896 A1 | 9/1979 |
| DE | 10 2015 204 841 A1 | 9/2016 |
| DE | 10 2017 100 612 A1 | 7/2018 |

OTHER PUBLICATIONS

Extended European Search Report for European Application No. 20168357.0 dated May 20, 2020, 6 pages.

* cited by examiner

*Primary Examiner* — James A Shriver, II
*Assistant Examiner* — Nicholas R. Kandas
(74) *Attorney, Agent, or Firm* — Amin, Turocy & Watson, LLP

(57) ABSTRACT

A vehicle body includes an energy source frame with a mounting system. The mounting system includes a mounting portion of the energy source frame extending along at least one side of the energy source frame and a sleeve with a first end and a second end. The mounting portion comprises an opening extending vertically through the mounting portion, and the opening comprises an entrance with a first dimension and a base with a rim and a second dimension. The second dimension is smaller than the first dimension. The sleeve is positioned through the opening with the first end sitting on the rim of the base and the second end extending vertically above the entrance.

20 Claims, 3 Drawing Sheets

MOUNTING SYSTEM FOR ENERGY SOURCE FRAME

CROSS-REFERENCE TO RELATED APPLICATIONS

This application claims priority to EP patent application no. 20168357.0 filed 7 Apr. 2020, entitled "MOUNTING SYSTEM FOR ENERGY SOURCE FRAME." The entirety of the aforementioned application is hereby incorporated herein by reference.

TECHNICAL FIELD

This is related to securing parts to a frame, particularly securing a sleeve to a frame.

BACKGROUND

Electric batteries for cars can be secured under the car frame with an energy source or battery frame which secures the vehicle body to the battery frame. The connection between the body and the frame typically involves a fastener, for example, a screw which passes through a sleeve in the battery frame and into the vehicle body, where a nut is threaded onto the screw to secure the components. The sleeve is generally welded to the battery frame.

SUMMARY

According to a first aspect of the invention a mounting system for an energy source frame is provided. The energy source frame could be for holding a battery, fuel cell, or any other electrical or other type of energy source or system. In some embodiments, the frame could hold other components. The mounting system comprises a mounting portion of the energy source frame extending along at least one side of the energy source frame and a sleeve with a first end and a second end. The mounting portion comprises an opening extending vertically through the mounting portion, and the opening comprises an entrance with a first dimension (e.g., diameter) and a base with a rim and a second dimension (e.g., diameter) which is smaller than the first dimension (e.g., diameter). The sleeve is positioned through the opening with the first end sitting on the rim of the base.

Such a mounting system can be a simple but secure way of mounting an energy source frame to a vehicle body without the need for welding sleeves to the energy source frame first. This can reduce manufacturing time by eliminating the need for welds and save on costs of manufacture and materials for mounting of the energy source frame to the vehicle body.

According to an embodiment, the second end of the sleeve extends vertically above the entrance to the opening. This can be beneficial in providing spacing between the energy source frame and the vehicle body, for example, for drainage; and/or can be used in configuring particular geometries to fit different energy source frames with different vehicle bodies. For example, sleeve could be easily machined down, e.g., 1 mm, to accommodate a frame and body connection that needed such a configuration, whereas in past systems such a configuration may require a redesign of the frame, body and/or connection.

According to an embodiment, the sleeve is an elongated hollow shape, for example, cylindrical or oval, though could even be other shapes in other embodiments (e.g., square, rectangular, triangular). The sleeve can have an outer dimension or diameter smaller than the first dimension but larger than the second dimension. If the sleeve were oval in shape, the opening would also be complementary configured to receive the sleeve, and the relative sizing of dimensions referenced for the opening and sleeve would be similar for both the larger and smaller oval dimensions or diameters. Optionally, the inner dimension of the sleeve can be substantially equal to the second dimension of the opening. By substantially equal, it can be up to 30% different, but close enough that the rim can still securely support the sleeve. The likely variance may simply be related to manufacturing tolerances, though could be 1-2 mm, 4-5 mm, or a different amount. Such a configuration ensures that the rim is able to properly support the sleeve without the need for welding, and that the sleeve is properly configured to fit within the opening entrance. In some embodiments, the fit could be a tight fit with the entrance, ensuring the sleeve stays in place before connection with a vehicle body (e.g., during transport and/or storage).

According to an embodiment, the mounting portion comprises a plurality of openings and a plurality of sleeves, each sleeve positioned through an opening with the sleeve first end sitting on the rim of the base. In some embodiments, each opening would have a sleeve, though in other embodiments some openings would not have a sleeve. Using a plurality of openings with a plurality of sleeves can ensure a secure connection.

According to an embodiment, the mounting portion is an extruded or roll formed metal. Optionally, this extruded metal can be Aluminium or steel (including alloys). Metals can ensure sufficient strength and stability of the mounting system.

According to an embodiment, the sleeve is a metal. Optionally, this can be Aluminium or another metal with sufficient strength and stability for the mounting system. The sleeve can optionally be formed from extrusion or other methods.

According to an embodiment, the mounting system further comprises a fastener mounted from one side of the opening and extending directly through the sleeve and through the opening. Such a fastener can be, for example, a bolt with nut; clamp, rod or other type of coupling to secure or hold the energy source frame to the vehicle body. By having a sleeve that can hold the fastener directly, the mounting system provides a simple yet effective method of connecting an energy source frame and a vehicle body According to a further aspect of the invention, an energy source frame comprises the mounting system. Optionally, the mounting system comprises two mounting portions, each mounting portion extending along opposing sides of the energy source frame and each mounting portion comprising a plurality of opening with a plurality of sleeves. These two sides can be the front and the back sides, or lateral sides. In other embodiments, the mounting portions could extend along more or fewer sides depending on system requirements (e.g., weight and configuration) for securing the energy source frame to the vehicle body.

According to a further aspect of the invention, the energy source frame is connected to a vehicle body. The energy source frame is secured to an underside of the vehicle body with a fastener securing the energy source frame to the vehicle body through the opening and sleeve. The fastener secures directly through the sleeve without the need for additional sleeves or seals, thereby forming a simple but secure fastening system for the energy source frame and the vehicle body. In some embodiments, the sleeve extends above the opening on one end and the second side of the sleeve secures against the vehicle body. In such an embodiment, the extension of sleeve above the opening entrance is a simple and stable way to ensure a gap between the energy source frame and the vehicle body to allow for drainage, thereby mitigating any damage (e.g., corrosion) from fluid build-up in the frames and/or crevices.

According to a further aspect of the invention, a method comprises obtaining an energy source frame with at least one mounting portion extending along a side of the energy source frame, the mounting portion comprising an opening with an entrance with first dimension and a base with an inwardly extending circumferential rim and a second dimension, with the second dimension being smaller than the first dimension; and inserting a sleeve into the opening through the entrance such that a first end of the sleeve is supported by the rim.

Such a method forms a simple, but secure method of forming a mounting system for an energy source frame that can simplify the manufacturing by reducing or eliminating the need for welds to connect the sleeve to the energy source frame.

According to an embodiment, the method further comprises connecting the energy source frame to a vehicle body by securing the second end of the sleeve against the vehicle body and connecting a fastener through the opening and sleeve such that a first end of the fastener is positioned against an outer side of the base. Such a method forms a secure mount between the energy source frame and vehicle body with a simple mounting system. In some embodiments, an upper part of the fastener extends through the sleeve and secures against the vehicle body maintaining a spacing for drainage between the two. Optionally, the method can further include a form of transport security, for example, a small weld, clamp, tight fit and/or other means of keeping the sleeve in place before connecting to the frame.

According to an embodiment, the method includes forming the sleeve, for example, through extrusion and/or machining.

According to an embodiment, the step of obtaining the energy source frame comprises forming the energy source frame by extruding or roll forming the energy source frame with at least one mounting portion. Optionally, this step further comprises punching and/or machining one or more openings into the mounting portion.

The details of one or more examples are set forth in the accompanying drawings and the description below. Other features, objects, and advantages of the disclosure will be apparent from the description and drawings, and from the claims.

DETAILED DESCRIPTION

Figure 1A:
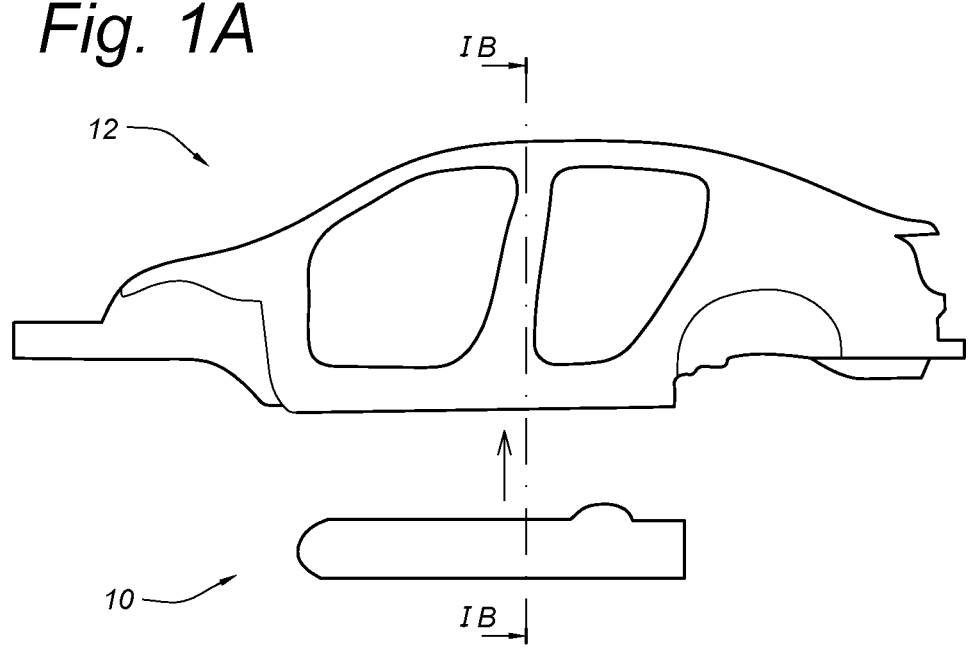
FIG. 1A is a schematic drawing of a vehicle body and an energy source frame, with the energy source frame not connected.
Figure 1B:
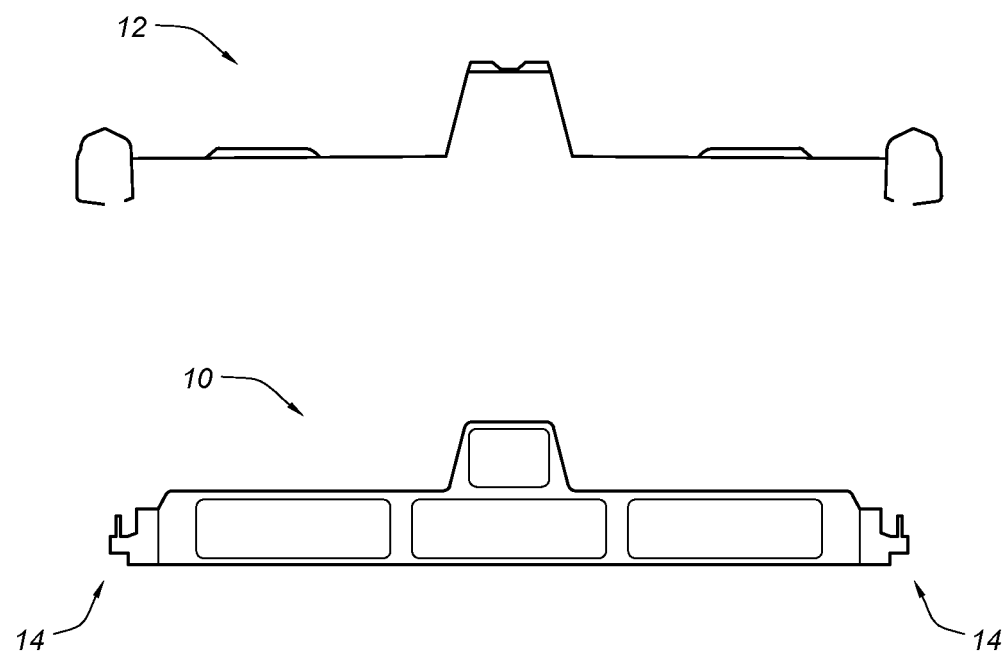
FIG. 1B is a cross-sectional schematic view of FIG. 1A along line B-B.

FIG. 1 is a schematic drawing of an energy source frame 10 and a vehicle body 12 which are not connected, and FIG. 1B is a cross-sectional schematic view along line B-B. Energy source frame 10 typically holds one or more batteries (or other energy source), and connects to an underside of the vehicle body 12.

Energy source frame 10 includes mounting portions 14 extending along two opposing sides for connecting the energy source frame 10 to the vehicle body, though some embodiments could include mounting portions 14 on a different number of sides of energy source frame 10. Energy source frame 10 is typically formed of a metal, for example, Aluminium (including alloys) and formed through an extrusion or roll forming process, though could be formed in another manner. Mounting portions 14 could be formed with energy source frame 10, or could be formed separately, for example, through a separate extrusion or roll forming process and connected to frame 10. Openings could be formed through punching, stamping, machining and/or other means.

To connect energy source frame 10 to vehicle body 12, energy source frame 10 is moved upward for correct positioning of mounting portions 14 with sides for mounting vehicle body 12. Mounting portions 14 are then secured to the side portions of vehicle body 12, as seen more clearly in the close-up cross-sectional view of FIG. 3.

Figure 2A:
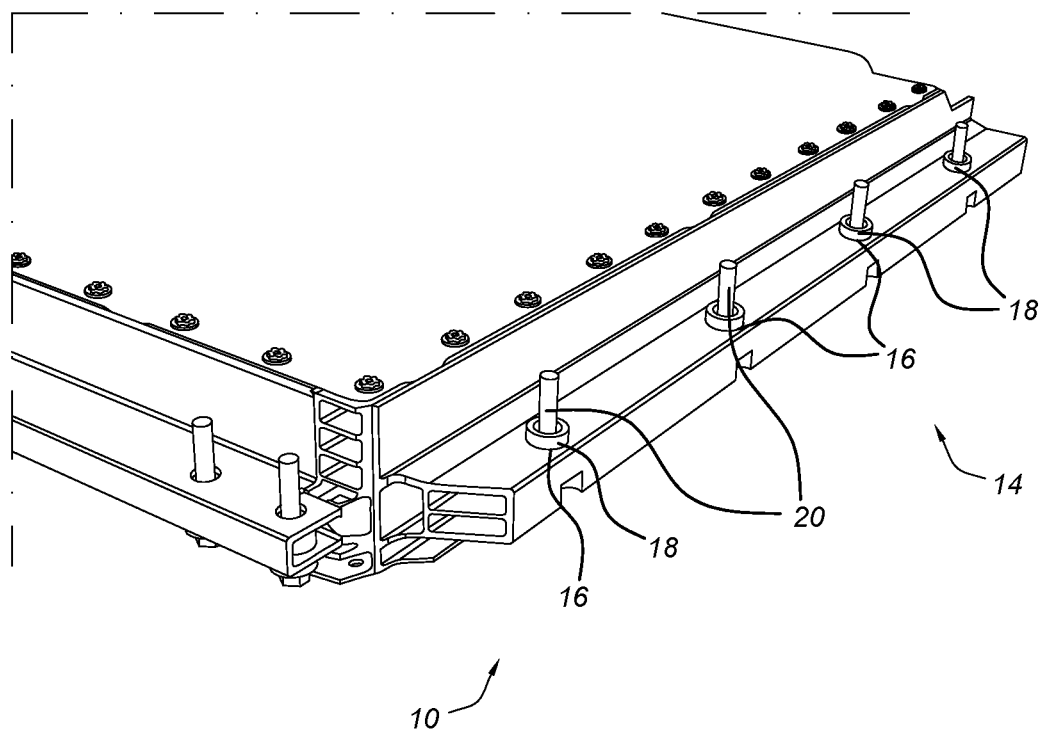
FIG. 2A is a perspective view of one side of an energy source frame and mounting system.
Figure 2B:
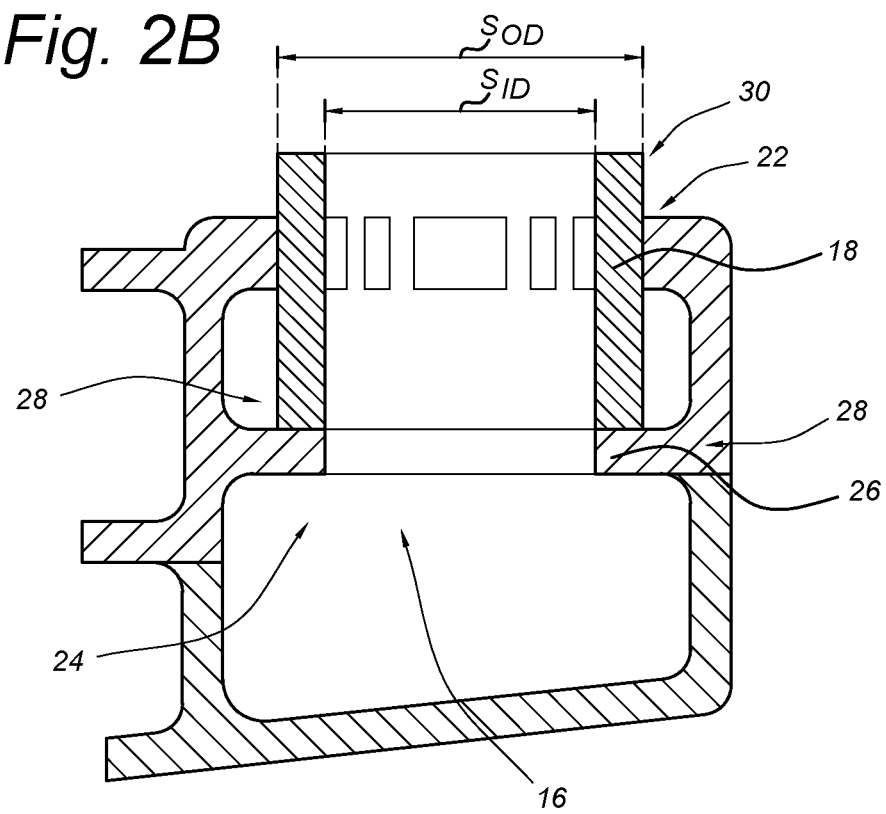
FIG. 2B is a cross-sectional view of a sleeve in an opening of the energy source frame mounting portion.
Figure 2C:
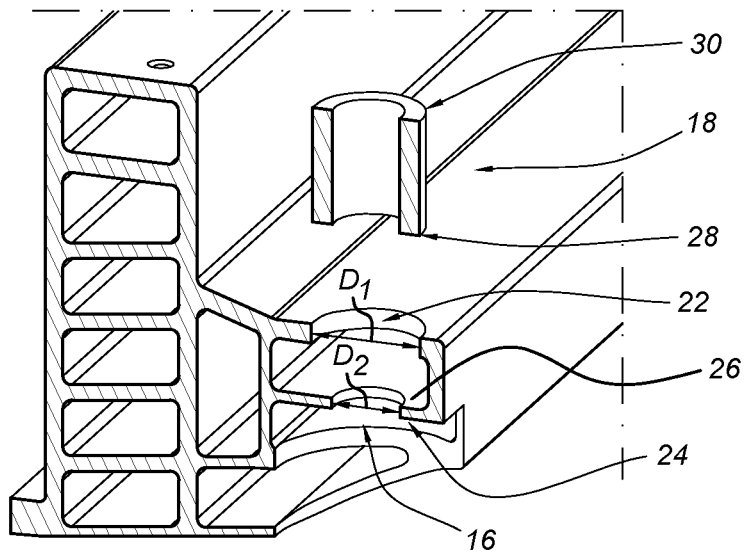
FIG. 2C is an exploded cross-sectional view of a sleeve and energy source frame mounting portion.

FIG. 2A is a perspective view of one side of energy source frame 10 and mounting system which includes mounting portions 14 with openings 16, sleeves 18 and fasteners 20. FIG. 2B is a cross-sectional view of a sleeve 18 in the opening 16 of the energy source frame 10 mounting portion 14; and FIG. 2C is an exploded cross-sectional view of a sleeve 18 and energy source frame 10 mounting portion 14. In the embodiment shown, mounting portion 14 includes four openings 16, each with a sleeve 18 and fastener 20, though other embodiments could include more or fewer openings with more or fewer sleeves and fasteners.

In the embodiment shown, mounting portion 14 extends along substantially the whole side of energy source frame 10, though this could be different in other embodiments. As can be best seen in FIGS. 2B-2C, each opening 16 has an entrance 22 with a first diameter $D_1$, a base 24 with a second diameter $D_2$, and a rim 26. The first diameter $D_1$ is larger than the second diameter $D_2$. The entrance 22 and base 24 are centred around a vertical axis running through the opening 16, and rim 26 extends circumferentially inward at base 24 from a vertical projection of entrance 22 onto base 24. Rim 26 acts as a stop and support for sleeve 18 (though could be slightly different in dimension than the thickness of sleeve 18 wall).

Sleeve 18 is cylindrical in shape with a first end 28, second end 30, inner diameter SID and outer diameter SOD. The sleeve outer diameter SOD is slightly smaller than the first diameter $D_1$ at entrance 22 of opening 16 such that the sleeve fits inside opening 16 (though this can be a tight fit in some embodiments). Sleeve 18 is inserted into opening 16 through entrance 22 and first end 28 of sleeve is positioned on rim 26 of base 24 to be supported by rim 26. Sleeve 18 inner diameter SID can be similar to the second diameter of opening 16 as shown in the Figures (see, e.g., FIG. 2B), or could vary in other embodiments as long as the dimensions are such that rim 26 of base 24 securely supports sleeve 18 in opening 16.

Sleeve 18 extends vertically out of opening 16 in the embodiment shown such that second end 30 is vertically higher than entrance 22 of opening 16 to set a gap between electric energy frame 10 and vehicle body 12 when connected. In other embodiments, the sleeve would not extend out of opening 16. Sleeve 18 can be formed of extruded or roll formed metal, for example, Aluminium (including alloys) or other material with sufficient strength and durability for the connection.

Figure 3:
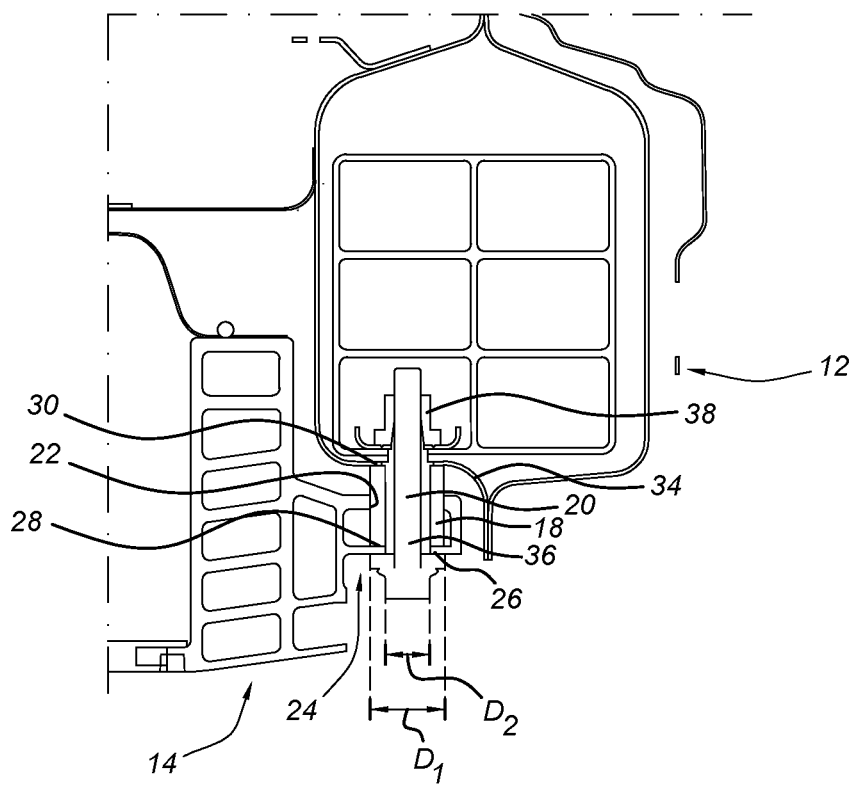
FIG. 3 is a close-up cross-sectional view of a connection between the energy source frame and the vehicle body.

FIG. 3 is a close-up cross-sectional view of a connection between the energy source frame 10 and the vehicle body 12. Once sleeves 18 have been positioned in openings 16 (which can be performed at another location and time prior to the vehicle and energy source frame connection), energy source frame 10 is moved into place to be connected to vehicle body 12 (as shown in FIGS. 1A-1B). The connection points to vehicle body 12 are at second end 30 of sleeves 18, which connect to vehicle body 12, though the configuration can include one or more seals 34. Frames 10 and body 12 are then secured together with fastener 20.

Fastener 20, in this case, a bolt 36 with nut 38 (which could include one or more washers or other fastener parts), extends from an outer or under side of the base 24, directly through sleeve 18, opening 16 and into an opening 40 in vehicle body 12. One side of fastener 20 is positioned against the outer side of base 24 and the other side of fastener 20 is positioned against vehicle body 12, thereby securing energy source frame 10 to vehicle body 12. In the embodiments shown, a head of bolt 36 rests against the underside of base 24, and nut 38 screws on to threads on the other end of bolt 36 inside vehicle body 12. Other embodiments could have different configurations for fastener 20.

Sleeve 18 second end 30 extends vertically above opening (due to the height of sleeve being larger than the height between opening 16 base 24 and entrance 22) such that second end of sleeve 18 contacts vehicle body 12 at a distance above energy source frame 10 mounting portion 14 in the embodiment shown. This allows for space between the two frames 10, 12 for drainage purposes. By configuring the connection for proper drainage, fluid does not become trapped between the energy source frame 10 and the body 12, thereby reducing or eliminating any crevice corrosion and overall deterioration from the fluid.

As discussed in the background section, in past configurations for mounting an energy source frame to vehicle body, rigid sleeves were generally inserted into an opening and welded to the opening. The mounting system shown in FIGS. 1A-3 allow for a mounting of an energy source frame 10 to a vehicle body 12 without needing to weld a sleeve to the energy source frame, thereby reducing points of vulnerability in the connection. By configuring opening 16 to have a base 24 with a smaller diameter $D_2$, rim 26 can support proper sleeve 18 positioning eliminating the need for a weld to connect sleeve 18 to energy source frame 10 and ensuring a secure support of sleeve 18 by energy source frame 10. Fastener 20 then extends directly through sleeve 18 and opening 16 base 24 and entrance 22, making for a simple, yet durable and secure mounting system for energy source frame 10. In some embodiments, sleeve 18 could be used as a simple means of configuring energy source frame and vehicle body connections with different geometric configurations. For example, sleeves 18 could be made a bit longer or machined down a bit to secure connections requiring a bit more or less vertical space without needing redesign, reconfiguration and/or machining of the energy source frame and/or vehicle body.

While a cylindrical sleeve with cylindrical opening is shown, the sleeve and opening could have many other complementary configurations, including but not limited to oval, square, rectangular and triangular. The relative diameters and their sizing would be related to the relative inner and outer dimensions of the specific geometrical shape(s) used.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular or preferred embodiments disclosed, but that the invention will include all embodiments falling within the scope of the appended claims.

What is claimed is:

1. A vehicle body with an energy source frame comprising a mounting system, the mounting system comprising:
   a mounting portion of the energy source frame extending along at least one side of the energy source frame, wherein the mounting portion comprises an opening that extends vertically through the mounting portion, wherein the opening comprises:
   an entrance with a first dimension, and
   a base with a rim and a second dimension, wherein the second dimension is smaller than the first dimension, and the entrance is closer to a connection portion of the vehicle body than the base; and
   a sleeve with a first end and a second end, the sleeve positioned through the opening with the first end positioned on the rim of the base and positioned to directly surround a fastener, wherein the energy source frame is secured to an underside of the vehicle body with the fastener securing the energy source frame to the vehicle body through the sleeve and the opening, and wherein the second end of the sleeve contacts the underside of the vehicle body at the connection portion to create a drainage space between the underside of the vehicle body and the mounting portion.

2. The vehicle body with the energy source frame of claim 1, wherein the sleeve is cylindrical or oval.

3. The vehicle body with the energy source frame of claim 2, wherein the sleeve has an outer dimension that is smaller than the first dimension and is larger than the second dimension.

4. The vehicle body with the energy source frame of claim 2, wherein the second dimension is substantially equal to an inner dimension of the sleeve.

5. The vehicle body with the energy source frame of claim 1, wherein the mounting portion comprises a plurality of openings and a plurality of sleeves, and each sleeve of the plurality of sleeves is positioned through a different opening of the plurality of openings, with the first end of the sleeve positioned on the rim of the base.

6. The vehicle body with the energy source frame of claim 1, wherein the mounting portion is an extruded or rolled form metal.

7. The vehicle body with the energy source frame of claim 6, wherein the mounting portion is comprised of Aluminium.

8. The vehicle body with the energy source frame of claim 1, wherein the sleeve is comprised of a metal.

9. The vehicle body with the energy source frame of claim 1, wherein the fastener is mounted from one side of the opening and extends through the opening and the sleeve in the vehicle body.

10. The vehicle body with the energy source frame of claim 1, wherein the first dimension is a first diameter and the second dimension is a second diameter.

11. The vehicle body with the energy source frame of claim 10, wherein the mounting system comprises two mounting portions extending along two opposing sides of the energy source frame.

12. The vehicle body with the energy source frame of claim 11, where each mounting portion of the two mounting portions comprises a plurality of openings and a plurality of sleeves.

13. The vehicle body with the energy source frame of claim 1, wherein the energy source frame is a battery frame.

14. A method comprising:
providing an energy source frame with a mounting portion extending along a side of the energy source frame for mounting the energy source frame to a vehicle body, wherein the mounting portion comprises an opening that extends through the mounting portion, wherein the opening comprises:
an entrance with a first dimension, and
a base with a rim and a second dimension which is smaller than the first dimension;
inserting a sleeve into the opening through the entrance such that a first end of the sleeve is supported by the rim and a second end of the sleeve extends outside of the entrance; and
connecting the energy source frame to a connection portion of the vehicle body by securing the second end of the sleeve against an underside of the vehicle body using a fastener through the opening and the sleeve such that a first end of the fastener is positioned against an outer side of the base and an upper part of the fastener extends through the sleeve and secures against the vehicle body at the connection portion to create a drainage space between the underside of the vehicle body and the mounting portion.

15. The method of claim 14, further comprising forming the sleeve for insertion.

16. The method of claim 14, wherein the providing the energy source frame comprises forming the energy source frame by extruding or roll forming the energy source frame with at least one mounting portion.

17. The method of claim 16, wherein the forming the energy source frame further comprises punching or machining the opening into the mounting portion.

18. A vehicle, comprising:
a vehicle body, and
an energy source frame comprising a mounting system, the mounting system comprising:
a mounting portion of the energy source frame extending along at least one side of the energy source frame, wherein the mounting portion comprises an opening that extends vertically through the mounting portion, wherein the opening comprises:
an entrance with a first dimension, and
a base with a rim and a second dimension, wherein the second dimension is smaller than the first dimension, and the entrance is closer to a connection portion of the vehicle body than the base; and
a sleeve with a first end and a second end, the sleeve positioned through the opening with the first end positioned on the rim of the base and positioned to directly surround a fastener, wherein the energy source frame is secured to an underside of the vehicle body with the fastener securing the energy source frame to the vehicle body through the sleeve and the opening, and wherein the second end of the sleeve contacts the underside of the vehicle body at the connection portion to create a drainage space between the underside of the vehicle body and the mounting portion.

19. The vehicle of claim 18, wherein the sleeve is cylindrical or oval.

20. The vehicle of claim 19, wherein the sleeve has an outer dimension that is smaller than the first dimension and is larger than the second dimension.

* * * * *